UNITED STATES PATENT OFFICE.

CHARLES VINCENT POTTER, OF BALWYN, VICTORIA, AUSTRALIA, ASSIGNOR TO ROBERT MAXMILLIAN HAHN, OF MELBOURNE, VICTORIA, AUSTRALIA.

OLEAGINOUS MIXTURE FOR SPRINKLING ON ROADS, &c.

No. 807,126. Specification of Letters Patent. Patented Dec. 12, 1905.

Application filed December 20, 1904. Renewed November 16, 1905. Serial No. 287,680.

*To all whom it may concern:*

Be it known that I, CHARLES VINCENT POTTER, engineer, a subject of the King of Great Britain and Ireland, residing at "Highton," Balwyn, in the British State of Victoria, Commonwealth of Australia, have invented a new and useful Improved Oleaginous Mixture for Sprinkling on Roads and the Like, of which the following is a specification.

This invention relates to an improved oleaginous mixture for sprinkling over roads and other surfaces to prevent dust. Also it improves the surface of said roads.

It consists, in the first place, of the admixture of about one-half to one per cent. of carbolic acid with oil, by which means the oil and the added water are mixed together, making an emulsion without saponification. After the carbolic acid has been thoroughly mixed with the oil or other oleaginous substance the said mixture is placed in a tank or suitable vessel and heat applied. Then when it is heated to, say, 150° Fahrenheit powdered asphaltum is added in the proportion of about five per cent., and said asphaltum quickly dissolves. Tar is now added in the proportion of from ten to fifty per cent. and the whole well stirred together. Further, the refuse left after the distillation of glycerin is also added at the rate of, say, five per cent., when the mixture or compound is ready for use. The mixture may then be pumped into a suitable cart or vessel, such as an ordinary water-cart, provided it is fitted with internal stirrers to keep the mixture agitated and mixed with the added water before being sprinkled on the road. The cold water added is in the proportion of from three of water to one of the mixture. This is for giving the first coat to the road. Afterward the water can be increased to ten to one of the mixture. The road is thoroughly soaked with water—say for half an hour—before applying the mixture. The combined mixture and water is then sprayed over the surface, and such is followed by another sprinkling of water alone. Then as soon as the mixture and water have soaked in the road is ready for traffic.

By the use of this mixture the surface of the road is kept in a moist and absorbent condition, and the dust that may be caused by the traffic or drift from other parts is caught or absorbed by the mixture and will be rolled or pressed by the traffic into a level and compact surface like asphalt.

It is advisable in summer months to apply a dressing of the mixture every month for, say, four months, and during the rest of the year—say every three months. The first dressing should be in the proportion of one of mixture to three of water, while the after dressings may be in the proportion of one of the mixture to ten of water. The absorbent properties of the mixture are increased by employing salt water instead of fresh water.

Having now described my invention, what I claim as new, and desire to secure by Letters Patent, is—

The herein-described mixture for the purpose specified consisting in the combination of carbolic acid, oil, powdered asphaltum, tar, glycerin refuse and water in the proportions mentioned and prepared substantially as described.

In witness whereof I have hereunto set my hand in presence of two witnesses.

CHARLES VINCENT POTTER.

Witnesses:
 N. J. S. THOMPSON,
 CHARLES HARKETT.